United States Patent [19]
Ebbesen et al.

[11] Patent Number: 5,641,466
[45] Date of Patent: Jun. 24, 1997

[54] METHOD OF PURIFYING CARBON NANOTUBES

[75] Inventors: Thomas Ebbesen; Pulickel M. Ajayan; Hidefumi Hiura, all of Tokyo, Japan

[73] Assignee: NEC Corporation, Tokyo, Japan

[21] Appl. No.: 253,168

[22] Filed: Jun. 2, 1994

[30] Foreign Application Priority Data

Jun. 3, 1993 [JP] Japan .................................. 5-133048

[51] Int. Cl.$^6$ .............................. C01B 31/00; D01F 9/12
[52] U.S. Cl. .................................. 423/447.2; 423/445 B; 423/447.1; 423/461
[58] Field of Search .......................... 423/445 B, 447.2, 423/447.1, 461

[56] References Cited

U.S. PATENT DOCUMENTS 5,346,683  9/1994  Green et al. .......................... 423/447.2

OTHER PUBLICATIONS

Saxby, J., et al. "Thermogravimetric Analysis of Buckminster Fullerene and Related Materials in Air", J. Phys. Chem., vol. 96 (1992), pp. 17–18.

Werner, H., et al. "Spectroscopic and Chemical Characterization of Fullerene Black", Chem. Phys. Lett., vol. 194, #1,2 (1992), pp. 62–66.

Ajayan, P., et al. "Opening Carbon Nanotubes With Oxygen and Implications for Filling", Nature, vol. 362, pp. 522–525 (Apr. 1993).

Iijima, S., et al. "Capillarity–induced Filling of Carbon Nanotubes", Nature, vol. 361, pp. 333–334 (Jan. 1993).

Ando, Y., et al. "Preparation of Carbon Nanotubes by Arc–Discharge Evaporation", Japan Journal of Applied Physics, vol. 32 (1993), Part 2, No. 1A/B, pp. L107–L109 (Jan. 1993).

Primary Examiner—Gary P. Straub
Assistant Examiner—Peter T. DiMauro
Attorney, Agent, or Firm—Popham, Haik, Schnobrich & Kaufman, Ltd.

[57] ABSTRACT

A mixture of carbon nanotubes and impurity carbon materials, which include carbon nanoparticles and may possibly include amorphous carbon, is purified into carbon nanotubes of high purity by utilizing a significant difference in oxidizability between the nanotubes and the nanoparticles. The mixture is pulverized and heated in the presence of an oxidizing agent at a temperature in the range from 600° to 1000° C. until the impurity carbon materials are oxidized and dissipated into gas phase. The nanotubes remain almost unoxidized except for loss of some lengths from the tube tips. It is suitable to perform the heating in air or oxygen.

7 Claims, 7 Drawing Sheets

METHOD OF PURIFYING CARBON NANOTUBES

BACKGROUND OF THE INVENTION

This invention relates to a method of purifying carbon nanotubes by removing coexisting carbon materials of different shapes.

A method for large-scale synthesis of carbon nanotubes is reported in Nature, Vol. 358(1992), No. 6383, pp. 220–222. The method is called a carbon arc plasma discharge method. In an inert gas at a pressure of 200–2500 torr, an arc discharge is made between two carbon rod electrodes by application of a suitable AC or DC voltage (e.g. about 18 V) to thereby produce a carbon plasma. The electric current is about 50–100 A. As the result a carbon deposit forms on the end of one of the two carbon rods, and a core part of the carbon deposit contains a large amount of carbon nanotubes. This core part can easily be separated from a shell part in which no carbon nanotubes exist. Usually carbon nanotubes occupy more than 65 wt % of the core part of the deposit, and the nanotubes coexist with some (less than 35 wt %) carbon nanoparticles which are nanometer-scale carbon particles with polyhedral cage structures. Sometimes a small amount of amorphous carbon also coexists.

Carbon nanotubes have good prospects of becoming valuable materials in the next generation industries ranging from chemical industry to electronical industry. However, for further studies and practical applications it is necessary to find a good method for separating carbon nanotubes from carbon nanoparticles and amorphous carbon. Although it is possible to accomplish the separation by using some of known physical separation techniques such as filtration, chromatography, etc., these techniques are generally troublesome and unsuitable for large-scale purification.

SUMMARY OF THE INVENTION

It is an object of the present invention to provide a method for easily and efficiently purifying carbon nanotubes coexisting with impurity carbon materials including carbon nanoparticles.

According to the invention, a mixture of carbon nanotubes and impurity carbon materials which include carbon nanotubes and may possibly include amorphous carbon is purified into carbon nanotubes of high purity by finely dividing the mixture into a powder form and heating the mixture in the powder form at a temperature in the range from 600° to 1000° C. in the presence of an oxidizing agent until the impurity carbon materials are oxidized and dissipated into the gas phase.

In the practice of the invention it is preferable to heat the pulverized mixture in an oxidizing gas, and it is suitable and convenient to use either air or oxygen as the oxidizing gas. Also it is convenient to use water vapor (steam) or carbon dioxide gas as the oxidizing gas, though it takes a considerably longer time to accomplish the complete oxidation of carbon nanoparticles.

The purification method according to the invention is very simple and very suitable for large-scale purification, and by this method it is possible to obtain carbon nanotubes of more than 99.9% purity.

It is well known that conventional carbon materials react with an oxidizing agent to form carbon dioxide or carbon monoxide if the supplied energy (heat) is sufficient to step over the activation barrier for the oxidation reaction. Examples of the oxidation reactions of carbon are represented by the following formulas.

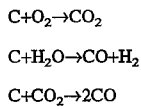

$$C+O_2 \rightarrow CO_2$$
$$C+H_2O \rightarrow CO+H_2$$
$$C+CO_2 \rightarrow 2CO$$

To initiate these oxidation reactions usually it is necessary to heat a carbon material to a temperature of 700°–1000° C., and that temperature depends on the kind of the carbon material and the concentration of the oxidizing agent.

With respect to carbon nanotubes it is known that the tips of the tubes are closed by pentagonal $C_5$ rings whereas the cylindrical side walls of the tubes are formed of hexagonal network of carbon atoms, and it is reported in Nature, Vol. 361(1993), No. 6410, pp. 333–334 that when carbon nanotubes are heated in air the tubes begin to oxidize at the tips to result in opening of the tips before oxidation of the side walls. We have confirmed that always this phenomenon occurs when any other kind of oxdizing agent is used instead of air. Probably this is because the tube tip regions are more greatly strained and accordingly higher in reactivity than the side walls. However, further heating of carbon nanotubes in the presence of an oxidizing agent results in oxidation of the side walls of the tubes.

Therefore, on an intuitional thought it seems to be impossible to purify carbon nanotubes coexisting with impurity carbon materials by an oxidation method. However, we have found that the side walls of carbon nanotubes are lower in reactivity to oxygen or an oxidizing agent than carbon nanoparticles, and furthermore we have experimentally confirmed that when a mixture of carbon nanotubes and carbon nanoparticles is heated under suitable oxidation conditions the nanoparticles are completely consumed in the oxidation reaction whereas the nanotubes remain almost unoxidized except for consumption of some lengths from the initially opened tips. We have tested various kinds of oxdizing agents, and the above described selective oxidation was confirmed in every case though the length of heating time necessary for complete oxidation of the nanoparticles is variable according to the kind and concentration of the oxidizing agent. Besides the difference in carbon atom arrangement between the shells of the the nanoparticles and the side walls of the nanotubes, another probable reason for the selective oxidation is a great difference in size between the nanoparticles and the nanotubes. That is, the nanoparticles are from tens of nanometers to about 100 nanometers in diameters whereas the nanotubes have lengths of several micrometers.

DESCRIPTION OF THE PREFERRED EMBODIMENTS

Figure 1:
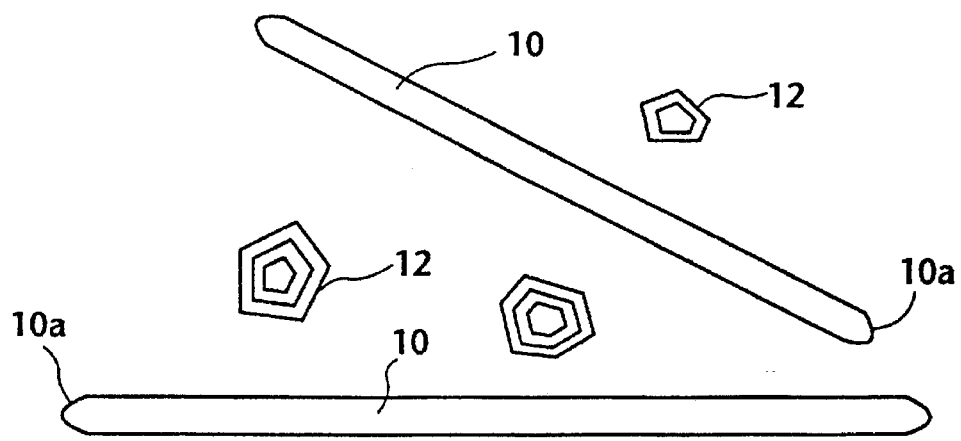
FIGS. 1(A) to 1(C) illustrate gradual changes in a mixture of carbon nanotubes and carbon nanoparticles caused by heating in an oxidizing atmosphere.
Figure 1:
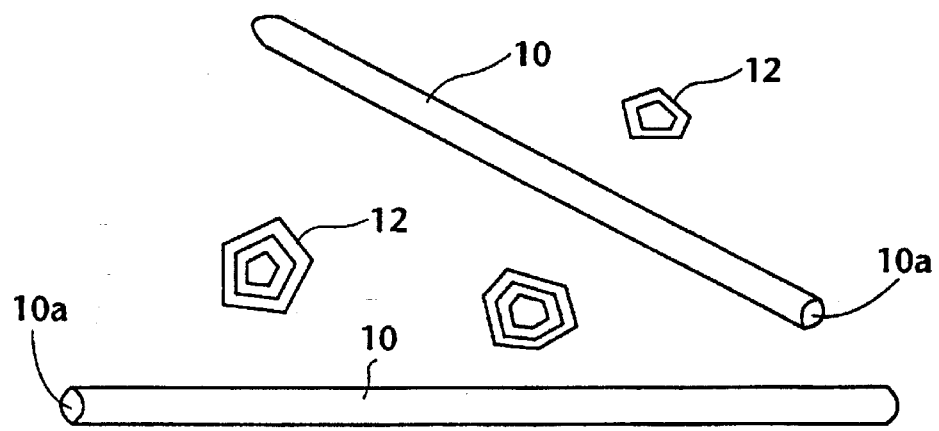
Figure 1:
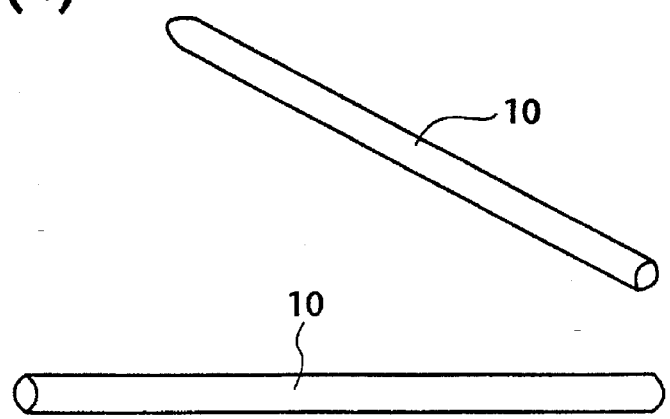

FIG. 1(A) is a model of a mixture of carbon nanotubes 10 and carbon nanoparticles 12. The tips 10a of the nanotubes 10 are closed. When the mixture is heated in an oxidizing gas at a suitable temperature the tips 10a of the nanotubes 10 preferentially undergo oxidation, and as a result the tube tips 10a are opened as shown in FIG. 1(B) while the nanoparticles 12 remain unoxidized. As the heating is further continued the nanoparticles 12 are oxidized to carbon monoxide and/or dioxide and completely vanish as shown in FIG. 1(C). When the heating is terminated at a suitable stage the nanotubes 10 remain in the form of open-ended tubes, though each tube 10 becomes somewhat shorter than the initial length by consumption of some lengths from the both ends in oxidation reaction. Amorphous carbon is more readily oxidized than the nanoparticles.

As an oxidizing agent which is indispensable to the present invention it is suitable and convenient to use oxygen gas, air (i.e. diluted oxygen gas), vaporized water (steam) or carbon dioxide gas. It is optional to use a still different oxidizing gas such as, for example, ozone, sulfur dioxide or nitrogen dioxide. Also it is possible to make a selection from other inorganic and organic oxidizing agents such as, for example, hydrogen peroxide, sulfuric acid, nitric acid, perchloric acid, peracetic acid and perbenzoic acid.

For the following examples, carbon nanotubes were formed by the carbon arc discharge method reported in Nature, Vol. 358(1992), No. 6383, pp. 220–222. In helium gas at a pressure of about 500 toff, a DC (or AC) voltage of about 18 V was applied between two graphite rods (one 6 mm and the other 9 mm in diameter) so as to make an arc dischage and produce a plasma between the two rods. The electric current was controlled at about 50–100 A. As a result, a carbon deposit formed on the end of the larger graphite rod, and a core part of the deposit was a mixture of carbon nanotubes and carbon nanoparticles. The core part of the deposit was ground into a powder.

EXAMPLE 1

An accurately weighed sample (about 20 mg) of the aforementioned powder was loosely packed in an quartz glass tube, which was left open-ended, and heated in a furnace filled with air (1 atm) for a predetermined period of time at a predetermined temperature. After that the sample was weighed to determine the amount of oxidized carbon. A fraction of the sample was ultrasonically dispersed in ethanol, and a drop of the dispersion liquid was dried over a grid of a transmission electron microscope (TEM) to make direct observation of qualitative changes in the sample. This method served the purpose of establishing optimum conditions of oxidation for purifying the crude carbon nanotubes.

Figure 2:
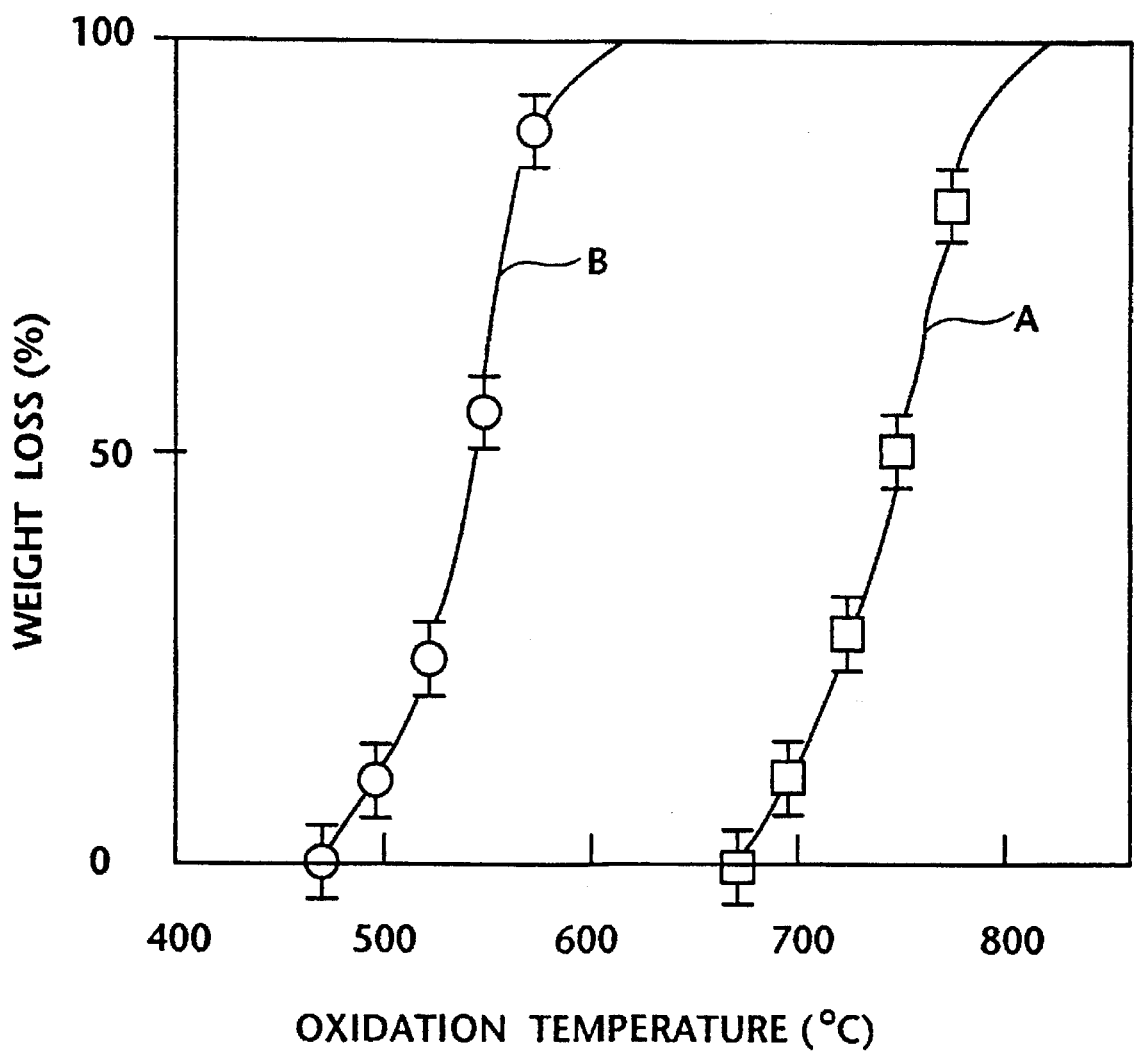
FIG. 2 is a graph showing the relationship between oxidation temperature and weight loss of a mixture of carbon natotubes and carbon nanoparticles by comparison with the case of oxidizing $C_{60}$.

Using air as an oxidizing agent, the heating of the sample containing carbon nanotubes was carried out at variously predetermined temperatures for a constant period of 15 min, and in every case the remaining sample was weighed to determine the amount of weight loss ($\Delta W$) of the sample as percentage of the initial weight (W). The result is represented by the curve A in FIG. 2. For comparison, the curve B represents weight loss of $C_{60}$ heated under the same conditions. The curve A indicates that a mixture of carbon nanotubes and carbon nanoparticles is rather resistant to oxidation by air at temperatures below a sort of critical temperature which is about 700° C., undergoes rapid oxidation at temperatures above that critical temperature and loses about 99% of the initial weight (within 15 min) when the temperature is close to 1000° C. Therefore, to purify crude carbon nanotubes coexisting with carbon nanoparticles by 15 min heating in air the heating temperature should be between 700° and 1000° C. The analysis of the temperature dependence represented by the curve A in FIG. 2 revealed that the oxidation of carbon nanotubes follows Arrhenius' equation and that the activation energy for oxidation by air is about 225 kJ/mol.

Figure 3:
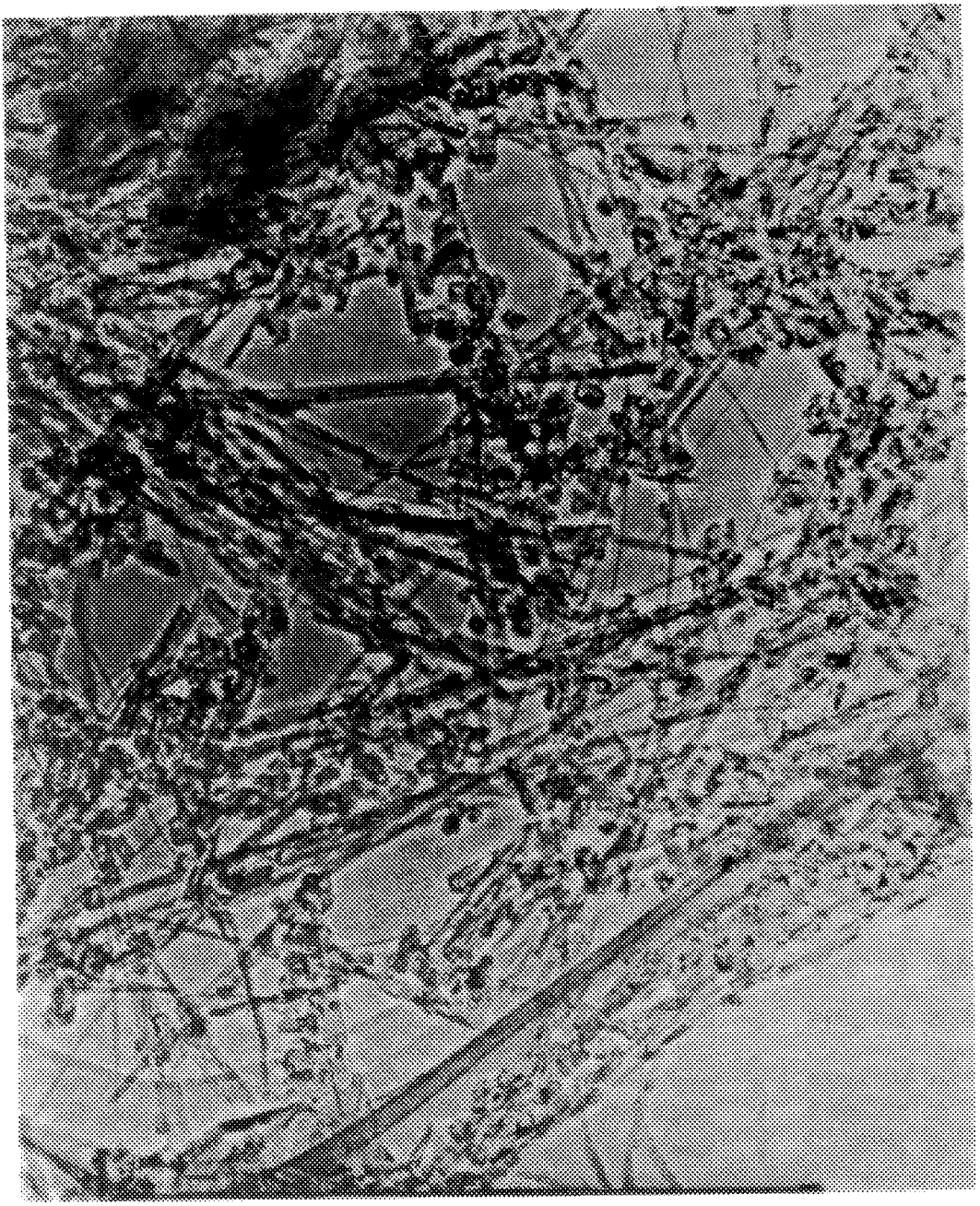
FIG. 3 is a transmission electron micrograph of a sample of crude carbon nanotubes coexisting with carbon nanoparticles.
Figure 4:
FIGS. 4 to 7 are transmission electron micrographs of four different samples of carbon nanotubes purified by oxidation in air, oxygen, steam and carbon dioxide, respectively.

Further tests of oxidation purification in air were made to find that optimum heating times are 20–60 min when the temperature is about 700° C., 5–30 min at about 850° C. and 1–10 min at about 1000° C. If the heating time is unnecsarily extended most of carbon nanotubes in the sample are lost. FIG. 3 is a TEM photograph (×40000) of the sample (crude carbon nanotubes coexisting with nanoparticles) before oxidation, and FIG. 4 is a TEM photograph (×40000) of the sample purified by heating in air for 15 min at 850° C.

EXAMPLE 2

Pure oxygen gas (1 atm) was used as the oxidizing agent. Except for this change, the oxidation method was the same as in Example 1.

At tmperatures above about 600° C. the sample containing carbon nanotubes underwent oxidation at high rates. By comparison with the purification of the same sample by heating in air, the purification by heating in pure oxygen gas could be accomplished at lower temperatures and in shorter times. To accomplish the purification by 15 min heating in oxygen, the temperature should be between 600° C. and 1000° C. Optimum heating times are 20–60 min when the temperature is about 600° C., 5–30 min at about 750° C., 1–10 min at about 900° C. and 0.5–5 min at about 1000° C.

Figure 5:

FIG. 5 is a TEM photograph (×40000) of the sample purified by heating in oxygen for 15 min at 750° C.

EXAMPLE 3

Figure 6:
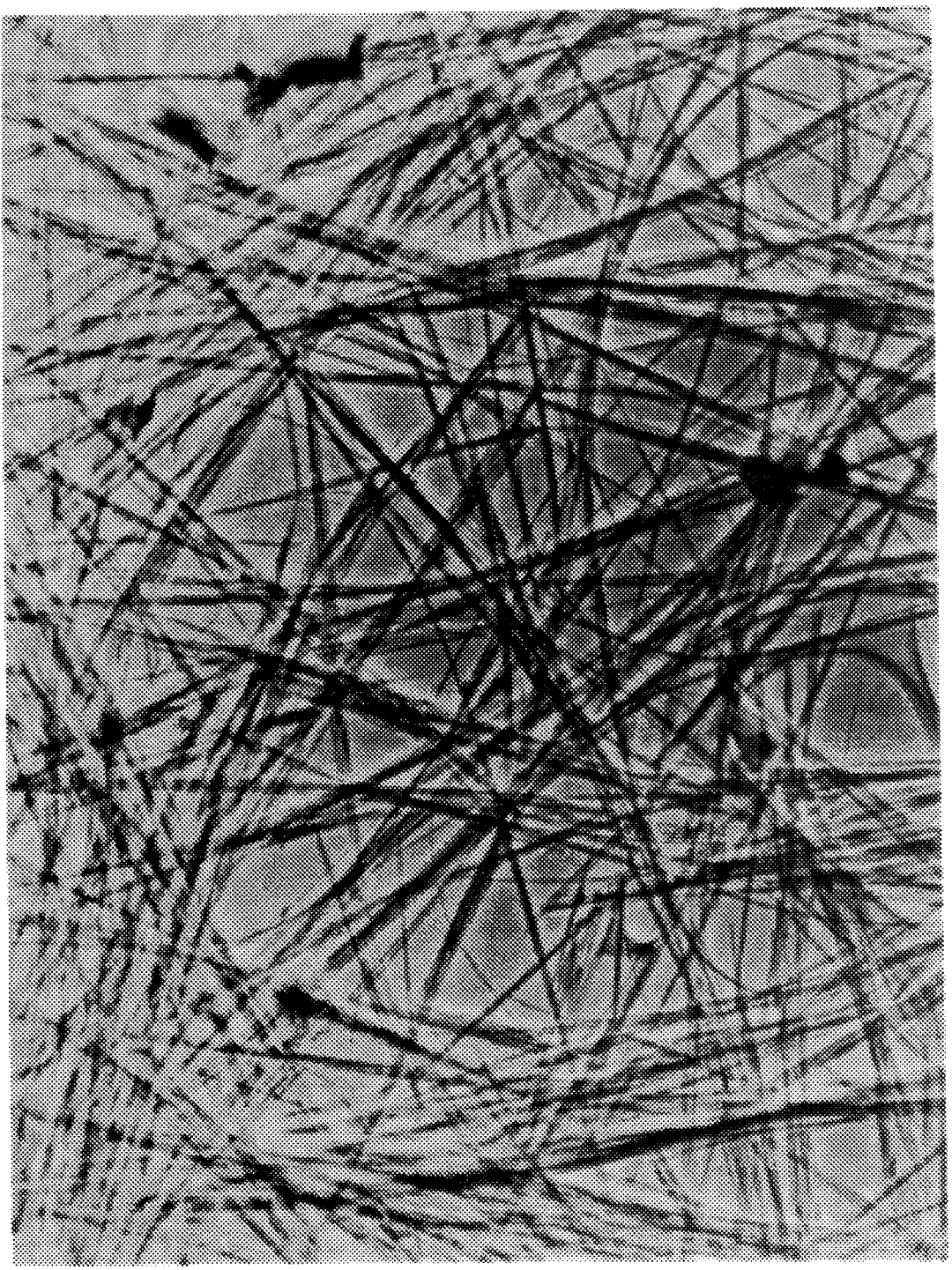

Steam (water vapor) was used as the oxidizing agent in place of air in the oxidation method of Example 1. In this case the rate of oxidation reaction was very low. When the heating temperature was 900° C. it was necessary to continue heating for 12 h to obtain purified carbon nanotubes shown in the electron micrograph (×40000) of FIG. 6.

EXAMPLE 4

Figure 7:
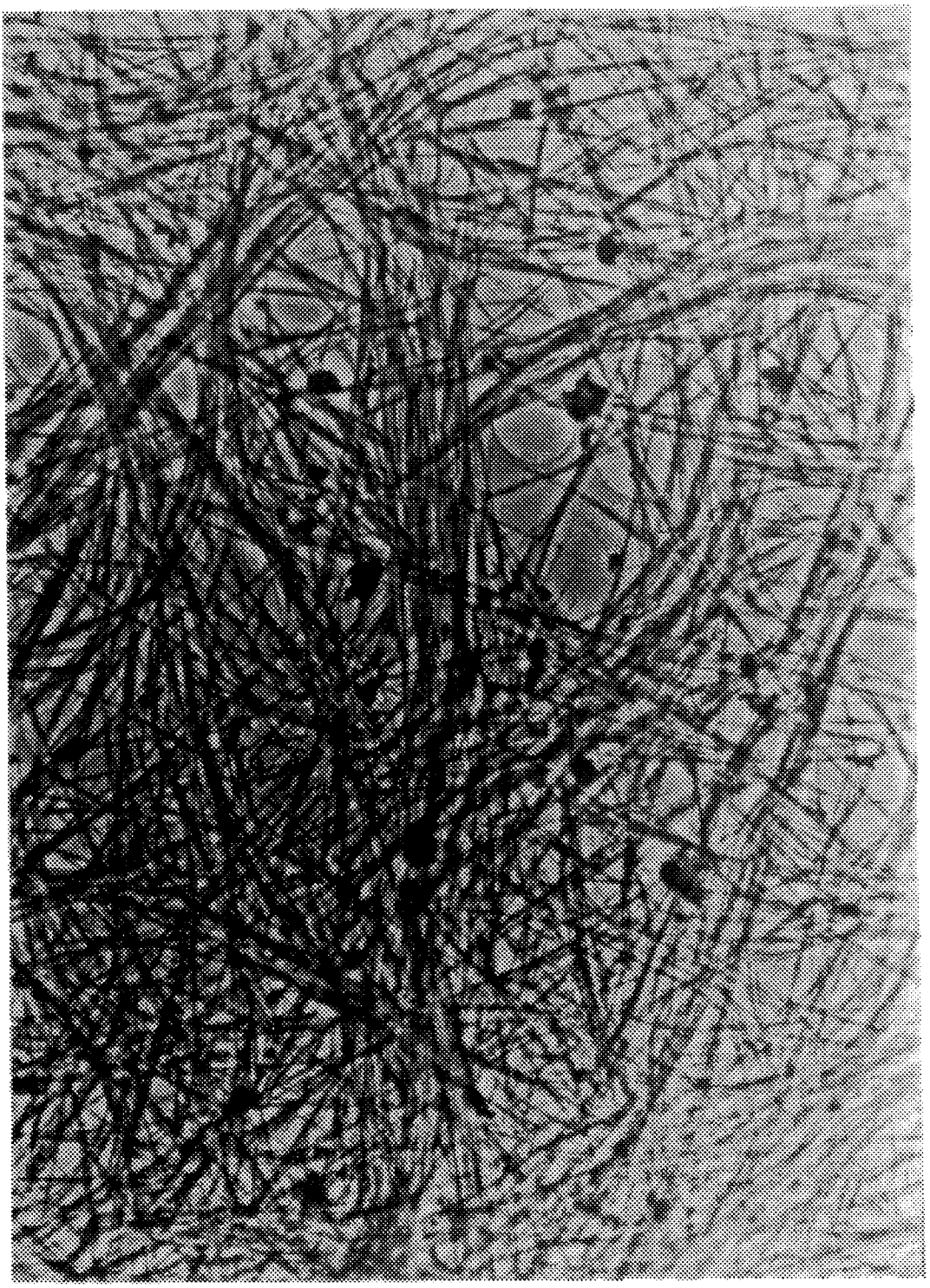

Carbon dioxide gas (1 atm) was used as the oxidizing agent in place of air in the oxidation method of Example 1. The rate of oxidation reaction was very low. When the heating temperature was 900° C., it was necessary to continue heating for 36 h. FIG. 7 is an electron micrograph of carbon nanotubes purified by heating under these conditions.

What is claimed:

1. A method of purifying a mixture of carbon nanotubes and impurity carbon materials which include polyhedral carbon nanoparticles which are smaller than about 100 nanometers in diameter, into carbon nanotubes of high purity, comprising the steps of:

finely dividing said mixture into a powder form; and heating said mixture in the powder form at a temperature in the range from 600° C. to 1000° C. in the presence of air or oxygen gas to selectively oxidize said impurity carbon materials until said impurity carbon materials are oxidized and dissipated into gas phase resulting in carbon nanotubes that are essentially free of carbon nanoparticles.

2. A method of purifying a mixture of carbon nanotubes and impurity carbon materials which include polyhedral carbon nanoparticles which are smaller than about 100 nanometers in diameter, into carbon nanotubes of high purity, comprising the steps of:

finely dividing said mixture into a powder form; and heating said mixture in the powder form in an oxidizing gas to selectively oxidize said impurity carbon materials at a temperature in the range from 600° C. to 1000° C. until said impurity carbon materials are oxidized and dissipated into gas phase resulting in carbon nanotubes that are essentially free of carbon nanoparticles.

3. A method according to claim 2, wherein said oxidizing gas is air.

4. A method according to claim 3, wherein said temperature is not lower than 700° C.

5. A method according to claim 2, wherein said oxidizing gas is oxygen.

6. A method according to claim 2, wherein said oxidizing gas is steam.

7. A method according to claim 2, wherein said oxidizing gas is carbon dioxide.

* * * * *